United States Patent [19]
Bolte

[11] Patent Number: 4,479,699
[45] Date of Patent: Oct. 30, 1984

[54] WIND DRIVEN ROTATABLE REFLECTOR FOR VEHICLES

[76] Inventor: Richard Bolte, P.O. Box 1745, Wausau, Wis. 54401

[21] Appl. No.: 242,846

[22] Filed: Mar. 12, 1981

[51] Int. Cl.³ .............................................. G02B 5/12
[52] U.S. Cl. ...................................... 350/99; 350/97; 350/96.24
[58] Field of Search ........................ 350/97, 99, 96.24; 116/28 R; 301/37 SA; 160/8

[56] References Cited

U.S. PATENT DOCUMENTS 3,437,803  4/1969  Seitz et al. ........................ 350/96.24
4,204,746  5/1980  Fisher .................................... 350/99

FOREIGN PATENT DOCUMENTS 14986  9/1980  European Pat. Off. .............. 350/97

*Primary Examiner*—John K. Corbin
*Assistant Examiner*—William A. Mintel
*Attorney, Agent, or Firm*—Harvey B. Jacobson

[57] ABSTRACT

A rotatable reflector which serves as a warnig device adapted to be mounted on the front area of a motorcycle to enable other vehicle operators, pedestrians, and the like, to more readily observe a motorcycle as it approaches. The reflector includes a rotatable shaft with a plurality of reflective bodies mounted thereon rotatable by air passing thereover as the motorcycle proceeds at low or high speed with means being provided to prevent rotational speed of the reflector beyond a predetermined maximum so that the reflector characteristics will not become diminished when the device rotates at an excessive speed. The reflector may be mounted on the front fender of a motorcycle with a suitable mounting bracket and be illuminated for use at night by the use of fiber optics associated with the motorcycle headlight for transmitting light for impingement upon the rotatable reflective, multicolored bodies. The rotatable reflective bodies are mounted within a hollow box or housing open at both the front and rear with the rotatable components being constructed so that they do not whistle or produce distracting noises when rotating with the device being quite simple in construction and easy to install.

3 Claims, 6 Drawing Figures

WIND DRIVEN ROTATABLE REFLECTOR FOR VEHICLES

BACKGROUND OF THE INVENTION

1. Field of the Invention

The present invention generally relates to a warning device for use on motorcycles, mopeds and also possibly bicycles and automobiles which provides a flashing reflectorized signal observable by operators of other vehicles, pedestrians, and the like, with the device being driven by wind or air as the vehicle on which it is mounted proceeds along a roadway at a predetermined speed with the device including illumination features to facilitate its use at night.

2. Description of the Prior Art

Many vehicles have been provided with reflectorized signs, movable reflectors and other warning devices to facilitate their observation by other vehicle operators, pedestrians, and the like. The following U.S. patents are known which relate to this field of endeavor:

U.S. Pat. No. 3,578,840—May, 18, 1971—Richards
U.S. Pat. No. 3,583,793—June 8, 1971—Crisogono
U.S. Pat. No. 3,757,730—Sep. 11, 1973—Douglas
U.S. Pat. No. 3,758,190—Sep. 11, 1973—Douglas
U.S. Pat. No. 3,963,307—June 15, 1975—Kirk
U.S. Pat. No. 4,103,924—Aug. 1, 1978—Suhm
U.S. Pat. No. 4,108,535—Aug. 22, 1978—Slaughter Even though devices have been provided to render vehicles more observable, there has been a continuing problem of other vehicle operators failing to observe an approaching motorcycle in an intersection, or the like, and pull out in front of the motorcycle. While the vehicle may see the motorcycle, he is not aware that it is approaching him at a speed that would cause the motorcycle to strike his vehicle, such as when the operator of the vehicle proceeds across an intersection. This occurs frequently and is primarily due to the fact that a motorcycle does not register on the operator of the vehicle pulling into a street or roadway that it is in fact a moving vehicle. Many injuries are caused by this type of accident where a vehicle pulls directly into the path of an oncoming motorcycle.

SUMMARY OF THE INVENTION

An object of the present invention is to provide a reflector mounted on the front of a motorcycle or similar vehicle which is rotatably driven by wind or air passing thereover with the reflector including a plurality of rotatable bodies having distinguishable bright, readily discernible colors to provide a flashing effect so that other vehicle operators will observe more readily the motorcycle and realize that it is a vehicle approaching them and that they should not pull out into the roadway. This is accomplished by the use of an ope-nended box or housing having a horizontally disposed shaft rotatably supported therein and supporting three or more rotating bodies thereon for rotation therewith with a suitable mounting bracket being provided for attachment to the front fender of a motorcycle immediately in front of and below the motorcycle headlight and with a structure also being provided to enable light to be transmitted from the headlight to the rotating bodies for illuminating them at night, thereby providing a warning device which is effective during daylight hours and during periods of darkness.

Another object of the invention is to provide a warning device in the form of a rotating reflector having a plurality of multiple colored bodies as set forth in the preceding object in which the shaft is provided with a governor structure to reduce the maximum speed that the shaft will obtain thereby preventing the colors from merely becoming a blur which would occur if the shaft rotated too fast. This is accomplished by the use of split ends on the shaft having flanges thereon so that as the shaft speed increases, the split shaft will spread apart and frictionally engage the aperture through which it extends on the housing to retard the rotational speed of the shaft.

Another important object of the invention is to provide a device in accordance with the preceding objects in which illumination of the rotating reflective bodies is obtained by the use of fiber optics attached to the lower part of the headlight lens on the motorcycle and extending down and through the flat surface of the box or housing thereby transmitting light to the rotating bodies for illuminating the same to enable the rotating bodies to be readily observable at night.

Yet another object of the present invention is to provide a rotatable reflector which serves as a warning device for use on the forward end of motorcycles or similar vehicles which is quite easy to install, simple and fool-proof in operation, effective for rendering the motorcycle more observable by vehicle operators or pedestrians looking at the forward end of the motorcycle as it approaches such a vehicle and which is capable of many adaptations for use on various vehicle and under various circumstances.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
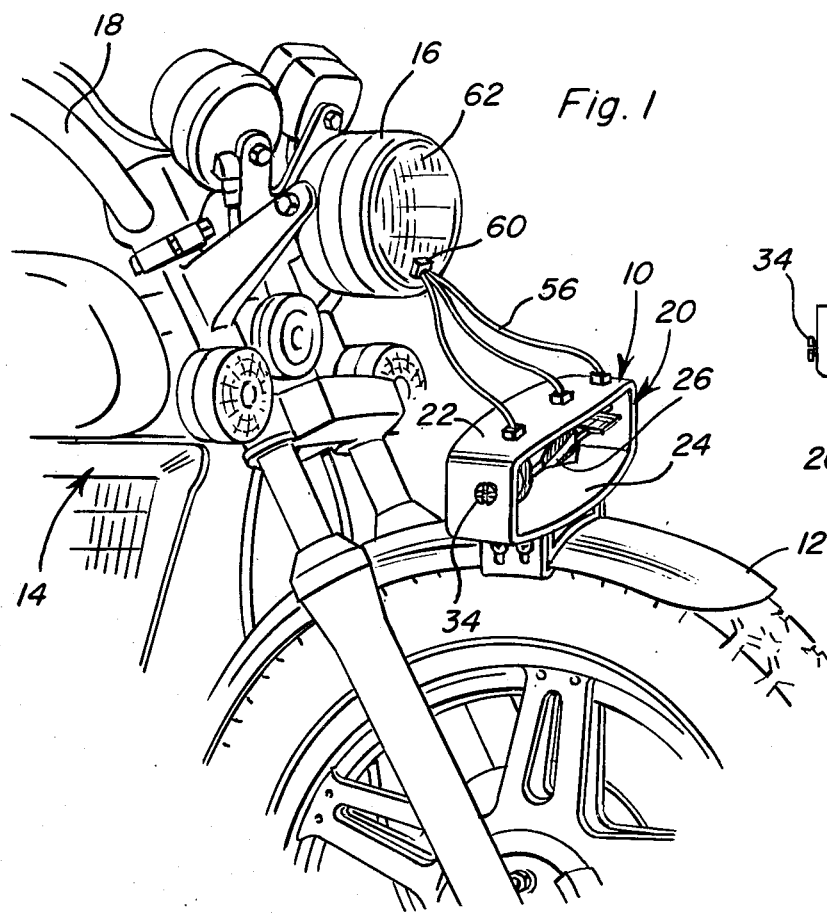
FIG. 1 is a perspective view of the forward end of a motorcycle illustrating the wind driven rotatable reflector mounted on the front fender immediately forwardly of and below the motorcycle headlight.
Figure 6:
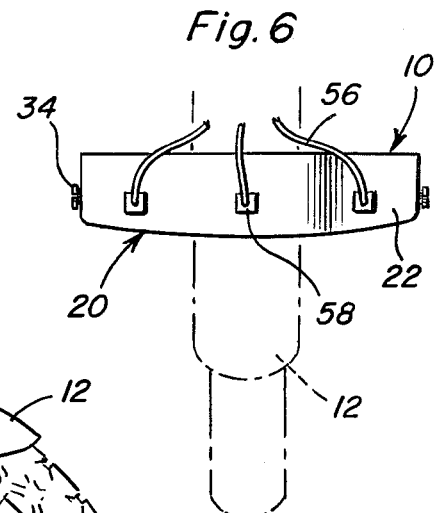
FIG. 6 is a top plan view of the reflector of the present invention.

Referring now specifically to the drawings, the rotatable reflector of the present invention is generally designated by the numeral 10 and is illustrated in FIG. 1 as being attached to the front fender 12 of a conventional motorcycle 14 having a headlight 16 disposed above the fender 12 and forwardly of the usual handle bars 18 and the like, with it being understood that the motorcycle is conventional and that there will be some variation between the association of the headlight 16 and front fender 12.

Figures 3, 4, 5:
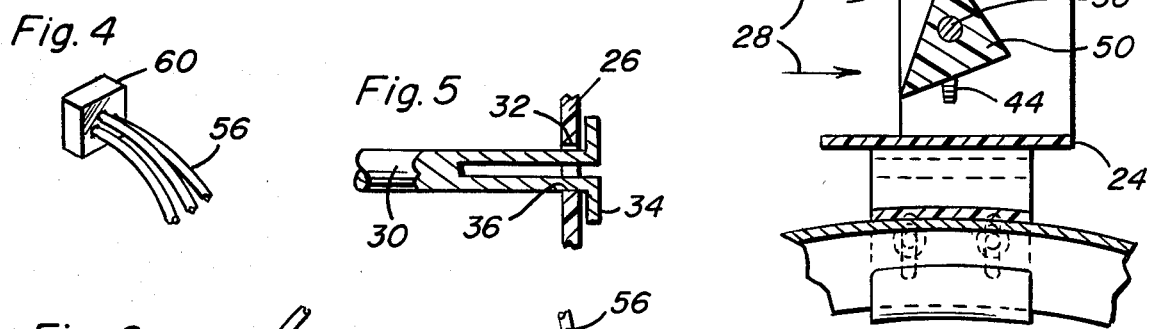
FIG. 3 is a vertical sectional view taken substantially upon a plane passing along section line 3—3 of FIG. 2 illustrating the specific structural details of one of the rotatable reflector bodies.
FIG. 4 is a fragmental perspective view of the fiber optic attachment to the headlight lens.
FIG. 5 is a fragmental sectional view of the split shaft illustrating the flanges thereon and the association with the aperture in the housing.

The reflector 10 includes a box or housing 20 which includes a top wall 22, a bottom wall 24 and end walls 26 in which the front and rear thereof are open for passage of wind or air therethrough as indicated by the arrows 28 in FIG. 3.

The box or housing 20 may be constructed of plastic material or the like and rotatably journaled in the horizontal center thereof with the support shaft 30 which has end portions extending through apertures 32 in the end walls 26 with the outer ends of the shaft 30 including a laterally extending flange 34 with a pair of longitudinal slits 36 extending from the outer ends of the shaft inwardly through the opening 32 and inwardly for a predetermined portion of the length of the shaft 30 which also may be constructed of plastic material. The inherent flexibility of the plastic material provides a braking action when the shaft 30 exceeds a predetermined rotational speed at which time the shaft segments on opposite sides of the longitudinal slits 36 will spread apart and come into frictional engagement with the periphery of the aperture 32 thus limiting the rotational speed of the shaft 30.

Figure 2:
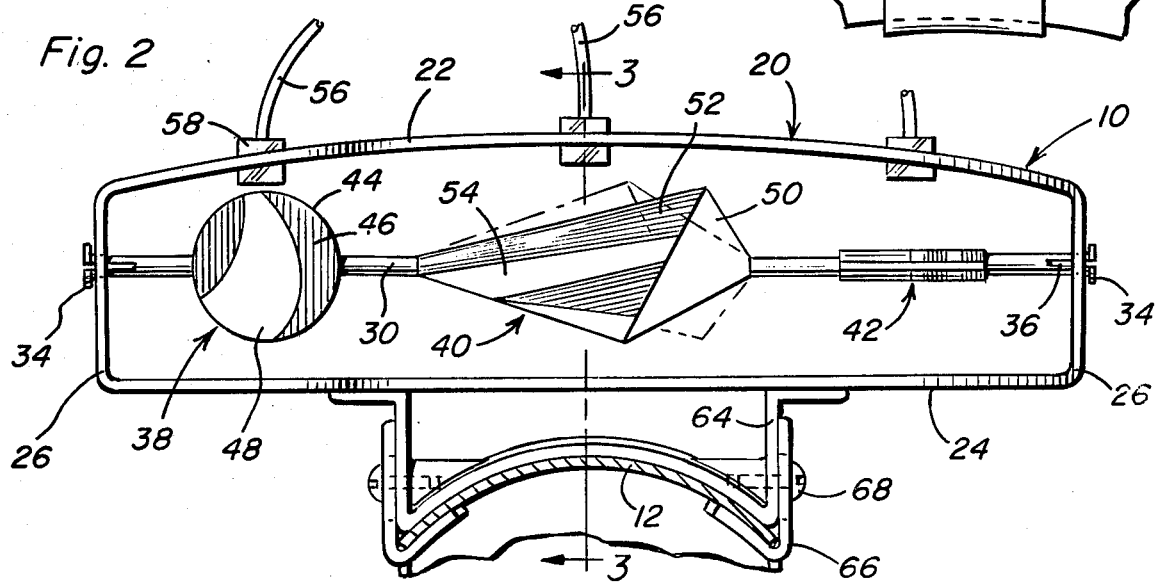
FIG. 2 is a front elevational view of the rotatable reflector illustrating the structural association of the components.

Mounted on the shaft 30 are three reflective bodies generally designated by the numerals 38, 40 and 42. The bodies 38 and 42 are in the form of substantially flat circular plates 44 having distinguishably colored areas 46 and 48 thereon, such as day-glow orange, white, and the like, with the body 38 being on one side of the shaft 30 and the body 42 being disposed centrally of the shaft 30 and generally at right angles to each other as illustrated in FIG. 2. The body 40 is generally in the form of a triangular body 50 which is eccentrically mounted on the shaft 30 and is also provided with distinguishable colored areas 52 and 54.

With this construction, the rotating reflective bodies 38, 40 and 42 will provide a flashing effect so that the motorcycle becomes more readily observable and also the observer will more readily recognize that the motorcycle is approaching him so that he will become aware that he should not drive his vehicle into the path of the oncoming motorcycle or the like.

For use at night, the top wall 22 has a plurality of optical fibers 56 connected therethrough by adapter grommets 58 as illustrating in FIG. 3 with the optical fibers 56 being connected to an adapter 60 at its upper end which is attached to the headlight lens 62 by adhesive or the like, adjacent the bottom thereof with the optical fibers being capable of transmitting light from the headlight 16 down through the optical fibers and onto the surfaces of the rotating bodies 38, 40 and 42 with the structure being sufficient to provide a flashing light effect of multicolors. The surfaces of the rotating bodies may be reflectorized and the number and character of the fiber optics may be varied depending upon the installational requirements.

The reflector bodies accomplish two results, namely, they serve as fan blades to rotate the shaft and serve as flashing reflectors to flash a visible warning to somebody observing the front of the motorcycle. The rotating bodies serve to provide rotation of the shaft at very low speeds with the governor provided by the split ends of the sleeve and flanges engaging the apertures through the end walls of the housing avoiding excessively fast rotation at higher speeds. The rotating shaft is the only moving part and is constructed so that it does not whistle and the rotating bodies also are constructed in a similar manner. The device is easily recognizable and observable for approximately one-half block with the faces of the three bodies on the shaft being covered with bright colors or stripes, such as day-glow orange, or a combination of bright colors, with the surfaces being reflectorized for better visibility at night. The faces on the rotating bodies are of different shapes and would rotate to provide an irregular pattern of flashes so as to catch the eye. The device is provided with a suitable mounting bracket such as indicated by numeral 64 in FIG. 2 with hook-shaped clamp elements 66 being provided for fixedly securing the device adjustably on the motorcycle fender 12 with suitable clamp screws 68 being provided for this purpose with it being understood that other types of mounting structures may be provided. Also, while fiber optics have been specifically disclosed, it is also within the purview of the present invention to utilize mirrors or prisms associated with the headlight to transmit light to the rotating bodies although the use of fiber optics is probably the most inexpensive way of obtaining illumination of the surfaces. Also, while the split shaft type of governor has been disclosed, the present invention also contemplates the use of other types of speed governors. For example, the triangular body may be hollow and filled with a gel having a small air pocket and a plastic ball of a density slightly heavier than the gel therein. This works somewhat in the nature of trying to spin a raw egg in which a rotational speed is obtained, but it is a relatively slow rotational speed.

Other types of rather simple mechanical governors may be provided for the shaft, such as an air foil which is associated with a brake which engages the shaft when the air foil is moved in response to a predetermined velocity of air flow over the air foil. Also, air foils may be provided to deflect the air in respect to the rotatable reflective bodies when a predetermined speed has been reached. As indicated, various relatively simple structures may be provided for controlling the rotational speed of the shaft and also for illuminating the reflective bodies at night.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wind driven rotatable reflector adapted to be mounted on the front of a motorcycle comprising a hollow body having an open front and rear end adapted to be mounted on the front fender of a motorcycle, a horizontal shaft rotatably journaled in said housing, a plurality of wind driven blades in the form of reflectorized bodies mounted on said shaft for rotation in response to air passing thereover and to provide a flashing effect for observation by persons in front of the motorcycle, said reflectorized bodies including staggered surfaces to provide a flashing effect, means associated with said shaft to maintain its speed below a maximum rotational speed to prevent the surfaces of the reflectorized bodies from becoming a blur which would occur if they rotate too fast, said means for limiting the rotational speed of the shaft including a bore in each end wall of the housing receiving the shaft, a flange on the outer ends of the shaft to retain it in the housing, and a pair of longitudinal splits in each end of the shaft extending inwardly to enable centrifugal force to move the ends of the shaft outwardly when rotating above a predetermined maximum speed to frictionally engage the periphery of the bore to provide a braking effect on the shaft.

2. The structure as defined in claim 1 wherein said housing includes bracket means supporting the housing forwardly and below a headlight on the motorcycle, and means transmitting light from the headlight to the surfaces of the relectorized bodies to provide flashing light illumination at night.

3. The structure as defined in claim 2 wherein said means transmitting light from the headlight to the reflectorized bodies includes a plurality of optical fibers attached to the headlight lens and extending through the top of the housing for transmitting light to the surfaces of the rotatable reflectorized bodies.

* * * * *